(12) United States Patent
Richter

(10) Patent No.: US 9,662,720 B2
(45) Date of Patent: May 30, 2017

(54) CYLINDRICAL DRILL BODY FOR A HOLE SAW

(71) Applicant: Robert Bosch GmbH, Stuttgart (DE)

(72) Inventor: Martin Richter, Zuchwil (CH)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 14/200,086

(22) Filed: Mar. 7, 2014

(65) Prior Publication Data

US 2014/0271007 A1 Sep. 18, 2014

(30) Foreign Application Priority Data

Mar. 14, 2013 (DE) .................. 10 2013 204 421

(51) Int. Cl.
B23B 51/04 (2006.01)

(52) U.S. Cl.
CPC ...... B23B 51/0453 (2013.01); B23B 51/0406 (2013.01); *Y10S 408/703* (2013.01); *Y10T 408/895* (2015.01); *Y10T 408/8953* (2015.01)

(58) Field of Classification Search
CPC ........... Y10T 408/895; Y10T 408/8953; Y10S 408/703; B23B 51/0453; B23B 51/0406
See application file for complete search history.

(56) References Cited

U.S. PATENT DOCUMENTS

| | | | | |
|---|---|---|---|---|
| 58,924 A * | 10/1866 | Webster | ................... | B23B 51/05 408/112 |
| 2,256,847 A * | 9/1941 | Osenberg | ................ | B23B 27/00 15/236.01 |
| 2,312,176 A * | 2/1943 | Kotowski | .............. | B28D 1/041 175/379 |
| 2,319,528 A * | 5/1943 | Barbour | ............... | B23D 61/025 408/205 |
| 2,427,085 A * | 9/1947 | Allison | ................ | B23D 59/025 29/DIG. 67 |
| 2,496,939 A * | 2/1950 | Gonzalez | ............... | B28D 1/041 408/202 |
| 2,662,428 A | 12/1953 | Mueller | | |
| 3,353,437 A * | 11/1967 | Fischer | ................ | B25D 17/005 279/76 |
| 3,961,858 A * | 6/1976 | Smith | ................. | B23B 51/0406 408/204 |
| D516,594 S * | 3/2006 | Morton | ........................ | D15/139 |
| 7,658,576 B1 | 2/2010 | Buzdum et al. | | |
| 8,221,037 B2 * | 7/2012 | Neitzell | ............. | B23B 51/0426 408/1 R |
| 2010/0089660 A1* | 4/2010 | Pearce | .................... | E21B 10/02 175/403 |
| 2011/0170966 A1 | 7/2011 | Novak et al. | | |

FOREIGN PATENT DOCUMENTS

GB 2 310 623 A 9/1997

\* cited by examiner

*Primary Examiner* — Eric A Gates
*Assistant Examiner* — Donte Brown
(74) *Attorney, Agent, or Firm* — Maginot, Moore & Beck LLP

(57) ABSTRACT

A cylindrical drill body for a hole saw has cutting teeth on an end side and at least one cutout, which is located in a lateral surface of the cylindrical drill body at a distance from the cutting teeth. The cutout has a rectilinear boundary edge directed parallel to the end side.

15 Claims, 2 Drawing Sheets

CYLINDRICAL DRILL BODY FOR A HOLE SAW

This application claims priority under 35 U.S.C. §119 to patent application no. DE 10 2013 204 421.6, filed on Mar. 14, 2013 in Germany, the disclosure of which is incorporated herein by reference in its entirety.

The disclosure relates to a cylindrical drill body for a hole saw.

BACKGROUND

US 2011/0170966 A1 describes a cylindrical drill body for a hole saw, at the end side of which cutting teeth for sawing out a cylindrical drilling core are introduced. In order to be able to remove the sawn out drilling core from the interior of the drill body, the wall of the drill body has an elongate, obliquely extending cutout, which makes it possible to introduce a pointed object radially from the outside through the cutout in the wall and bring it into contact with the drilling core, and to push said drilling core axially out of the drill body with manual support. The cutout has a rectilinear boundary edge, which extends at an angle of about 45° to the end side of the drill body. That edge of the cutout that is opposite the rectilinear, oblique boundary edge has a curved profile.

U.S. Pat. No. 7,658,576 B1 shows a hole saw having an approximately cylindrical drill body having cutting teeth on one end side. Three similar, large-area cutouts are introduced into the lateral surface of the drill body in a manner distributed around the circumference, said cutouts each being separated from one another by a narrow web in the circumferential direction. The large-area cutouts reduce the lateral surface area by more than 50% and each have an approximately rectangular cross section. A significant weight reduction is achieved by means of the cutouts, but this is associated with a loss of stability.

SUMMARY

The disclosure is based on the object of creating a stable drill body for a hole saw using simple design measures, wherein a drilling core, which is produced when sawing with the hole saw, can be removed easily.

The drill body according to the disclosure is used in hole saws and is used to saw a circular or cylindrical drilling core out of a workpiece. The drill body is provided on an end side with cutting or sawing teeth or a similar separating geometry, said teeth extending around the entire circular end side in the circumferential direction. The hollow-cylindrical drill body may optionally be coupled to a center drill so as to rotate therewith, said center drill being positioned at the center of the drilling core to be sawn out.

Cutouts, which are at an axial distance from the cutting teeth, are introduced into the lateral surface of the hollow-cylindrical drill body. The cutouts are used to axially remove the drilling core that is located in the interior of the drill body after sawing out, in that a pointed object is passed radially from the outside through a cutout until it comes into contact with the drilling core, and the latter is pushed axially out of the drill body.

The cutouts in the lateral surface of the drill body according to the disclosure have an at least sectionally rectilinear boundary edge. This boundary edge is directed at least approximately parallel to that end side of the drill body which has the cutting teeth.

The boundary edge, which bounds the cutout in the lateral surface, forms a supporting edge, along which the tool can be introduced radially from the outside in order to come into contact with the drilling core. The boundary edge extending at least substantially parallel to the end side makes it possible to position the tool at different circumferential positions along this boundary edge, with the result that operability is improved and it is easier to eject the drilling core from the drill body. In contrast to the embodiment in the prior art, in which the boundary edges of the cutout extend obliquely, that is to say at an angle to the end side, in the embodiment according to the disclosure, it is possible, on account of the at least approximately parallel configuration of the boundary edge, to position the tool at different positions in the circumferential direction along the boundary edge, without there being the risk, as in the prior art, of the tool accidentally slipping off the boundary edge without sufficient contact with the drilling core to be removed.

The boundary edge of the cutout may optionally be arranged exactly parallel to the end side, provided with cutting teeth, of the drill body. However, it is also possible for the boundary edge to be at a small angle of at most 10° to the end side, for example an angle of 5°. At this angle, the boundary edge still extends approximately in the circumferential direction, and it is possible to position the tool at different positions along the boundary edge, without accidentally slipping in the direction of one end point of the boundary edge on account of the oblique position.

The boundary edge extends at least substantially along one side of the cutout, preferably along the entire length of this side of the cutout. In this case, it is advantageous for the rectilinear boundary edge to be located on that side of the cutout that is remote from the cutting teeth, such that, when the tool is positioned on the boundary edge, there is sufficient axial adjustment space in the direction of the cutting edge in order to eject the drilling core.

According to a further advantageous embodiment, the cross section of the cutout narrows in the direction of the cutting teeth. This has the advantage that the drill body is weakened least by the cutouts next to the end edge having cutting teeth and thus has the greatest stability in the region of the cutting teeth, and accordingly can absorb high forces or torques. The high loads that occur in the region of the cutting teeth can thus be absorbed by the drill body without impairing its stability. At the same time, that side of the cutout which is remote from the cutting teeth is widened in a corresponding manner, such that this boundary edge or supporting edge provides a greater free space in the circumferential direction for the positioning of the tool in the radial direction. As a result, it is easier to detach the drilling core from the drill body.

A plurality of cutouts are introduced into the drill body, but are separated from one another. In this case, it may be advantageous to arrange the cutouts in a particular manner with respect to one another, for example in such a way that the cutouts are arranged in succession in the axial direction of the drill body, wherein the cutouts are expediently separated from one another by a rectilinear web, so that mutually adjacent boundary edges of different cutouts are each formed in a rectilinear manner. The cutouts, which are arranged axially at different distances from the end side of the drill body, can have different cross-sectional areas. In this case, it is expedient for the cross-sectional area to increase with increasing distance from the end side having the cutting teeth. This has the advantage that the material weakening is lowest next to the end side having the cutting teeth.

The cutouts can be arranged in accordance with further criteria; for example, the cutouts can adjoin a line, extending in the axial direction, in the lateral surface, wherein the cutouts may each be at the same distance from the line or at different distances.

Furthermore, cutouts may be arranged in a manner distributed around the circumference, for example a plurality of cutouts, which are each arranged immediately adjacent to one another and each form a cluster, on different sides of the lateral surface of the drill body.

The cutouts can, while being at different axial distances, also be at least partially displaced in the circumferential direction with respect to one another. For example, two or more adjacent cutouts are arranged in a manner offset with respect to one another in the circumferential direction to such an extent that an imaginary axial line intersects these cutouts. In this embodiment, the cutouts overlap in the circumferential direction but not in the axial direction.

Furthermore, embodiments are also possible in which at least two cutouts are arranged in a manner offset with respect to one another in the circumferential direction to such an extent that there is no overlap in the circumferential direction. In this variant embodiment, it is possible for an overlap to be formed in the axial direction, and embodiments without overlaps in the axial direction are also possible.

Advantageously, the entire area which is removed from the lateral surface of the drill body by the cutouts, is not greater than 50% of the entire lateral surface area of the drill body. Optionally, the area of the cutouts as a whole is at most 10%, at most 20%, at most 30% or at most 40% of the entire lateral surface area of the drill body.

Optionally, the cutouts, while being arranged in an axially offset, axially non-overlapping manner, may also be arranged in an overlapping, offset manner with respect to one another in the circumferential direction, such that a lateral edge of each cutout is oriented with an imaginary reference line which optionally extends at an angle to the axial direction. This reference line can be oriented with respect to the direction of rotation of the hole saw. In this way, a jammed drilling core can be detached better from the drill body.

Furthermore, it may be expedient for the transition, within the cutouts, from a rectilinear lateral edge to an adjacent lateral edge oriented in an angled manner to be embodied by means of rounded radii. As a result, local force spikes are avoided or reduced at the transition.

The cutouts may optionally be introduced by way of punching into the lateral surface of the drill body.

According to a further expedient embodiment, the cutouts, despite having different sizes, are formed in a similar manner, for example configured in a trapezoidal manner. However, it is also possible to provide cutouts having different cross-sectional shapes. Furthermore, it may be expedient to provide different proportions even for cutouts having similar cross sections, that is to say different ratios of axial length to width in the circumferential direction.

BRIEF DESCRIPTION OF THE DRAWINGS

Further advantages and expedient embodiments can be gathered from the claims, the description of the figures and the drawings, in which:

In the figures, identical components are provided with identical reference signs.

DETAILED DESCRIPTION

Figure 1:
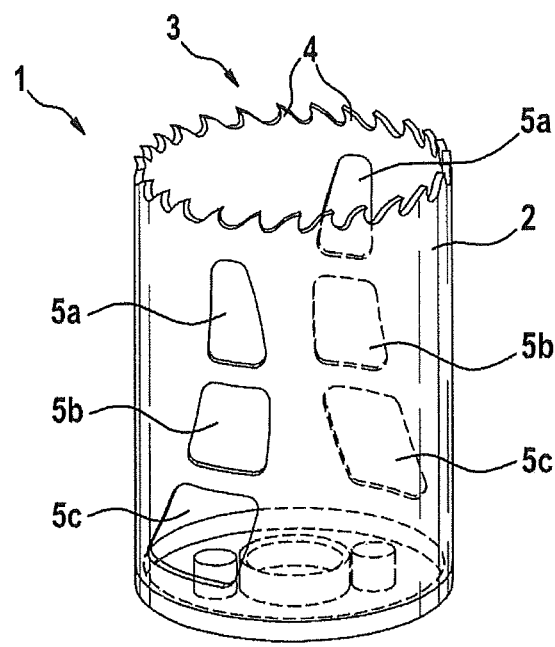
FIG. 1 shows a perspective view of a hollow-cylindrical drill body for a hole saw, having a plurality of cutouts introduced into the lateral surface of the drill body.

FIG. 1 illustrates a hollow-cylindrical drill body 1 for a hole saw, by way of which a circular or cylindrical drilling core can be sawn out of a workpiece. The drill body 1 has a cylindrical lateral surface 2, on one end side 3 of which the cutting teeth 4 are arranged in a manner distributed around the circumference. The drill body 1 is formed in an open manner in the region of the end side 3.

A plurality of cutouts 5a to 5c are introduced into the lateral surface 2 of the drill body 1, said cutouts 5a to 5c extending through the wall of the lateral surface 2 but being located at a distance from the end side 3 having the cutting teeth 4 with respect to the longitudinal axis of the drill body 1. A total of six cutouts 5 are provided, wherein in each case three cutouts 5a to 5c are located immediately in succession in the manner of a cluster in the axial direction of the drill body. In each case three cutouts 5a, 5b, 5c that are identical to one another are located on diametrically opposite sides in the exemplary embodiment. The cutouts 5a to 5c make it possible, in order to eject the drilling core which is located in the interior of the drill body 1, to introduce a tool radially from the outside through one of the cutouts until it comes into contact with the drilling core, and to push the latter out of the drill body 1 axially in the direction of the end side 3 having the cutting teeth 4.

Figure 2:
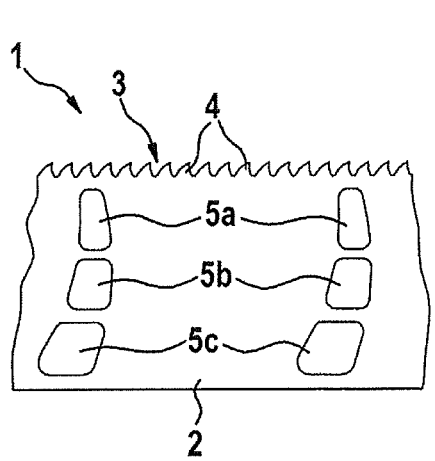
FIG. 2 shows the lateral surface of the drill body according to FIG. 1 in the unrolled, planar state.
Figure 3:
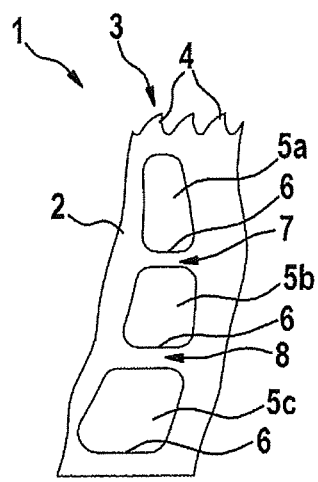
FIG. 3 shows an enlarged illustration of three cutouts, located one above another, in the lateral surface.

As can be gathered from FIG. 1 in conjunction with the further FIGS. 2 and 3, each cutout 5a, 5b, 5c has a boundary edge 6 which is formed in a rectilinear manner and extends parallel to the end side 3 having the cutting teeth 4 in the circumferential direction. The rectilinear boundary edge 6 is located on that side of each cutout 5a, 5b, 5c which is remote from the end side 3 having the cutting teeth 4. This boundary edge 6 forms a horizontal supporting edge, on which a tool, for example a screwdriver, can be positioned from the outside, wherein the tip of the tool comes into contact with the drilling core located on the inside and pushes said drilling core out of the interior of the drill body 1 by way of an axial movement of the tool in the direction of the end side 3.

Each cutout 5a, 5b, 5c narrows in the direction of the end side 3 having cutting teeth 4. Furthermore, the cutouts extend further in the circumferential direction of the drill body 1, the greater the axial distance of the cutouts from the end side 3 having the cutting teeth 4; the extent in the circumferential direction within one cutout is greatest in the region of the boundary edge 6 remote from the end side 3. The cross-sectional areas of the different cutouts 5a, 5b, 5c differ from one another, wherein the cross-sectional area increases with increasing distance from the end side 3 having the cutting teeth 4. The cutouts are each formed at least approximately in a trapezoidal manner, wherein the lateral edges, which adjoin the boundary edge 6, extend at different angles from cutout to cutout. On the side facing the end side 3 having the cutting teeth 4, the closest cutout 5a has a rounded boundary edge, whereas the cutouts 5b and 5c located further away each have a rectilinear boundary edge. All three adjacent cutouts 5a to 5c extend along an imaginary axial line which intersects the three cutouts.

The cutouts 5a to 5c are axially spaced apart, and as a result an intermediate web 7 and 8, respectively, is formed between adjacent cutouts. The web 7 and 8, respectively, is embodied in a rectilinear manner having mutually parallel sides, which each form facing boundary edges of the adjacent cutouts.

Figure 4:
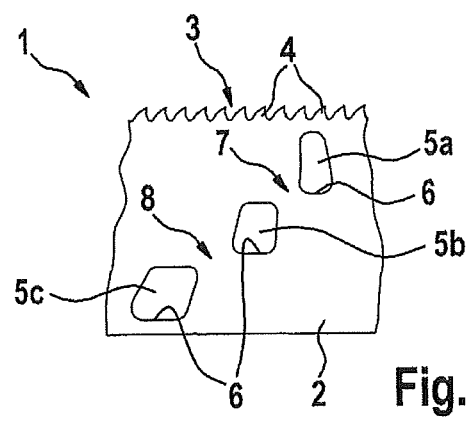
FIG. 4 shows a detail of the lateral surface of a cylindrical drill body having three cutouts, which are offset in the circumferential direction and are located at a distance from one another in the axial direction.
Figure 5:
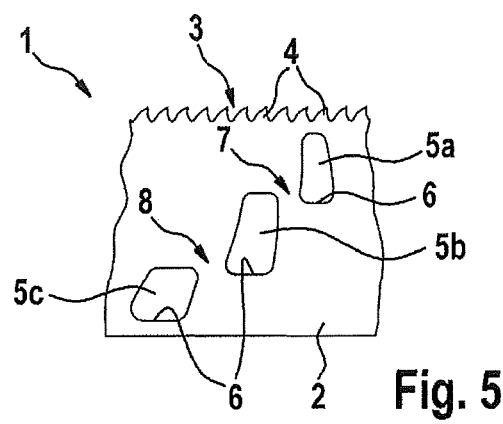
FIG. 5 shows a variant embodiment of a drill body having three cutouts, which are offset in the circumferential direction but overlap in the axial direction.
Figure 6:
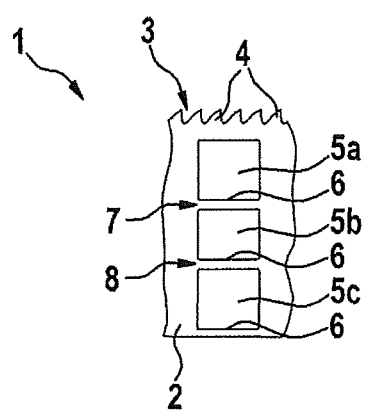
FIG. 6 shows three cutouts in the lateral surface of a drill body in a further variant embodiment.

Variant embodiments of a drill body 1 having three adjacent cutouts 5a, 5b and 5c are illustrated in FIGS. 4 to 6. According to FIG. 4, the cutouts 5a, 5b, 5c are each formed, similarly to the first exemplary embodiment according to FIGS. 1 to 3, in an approximately trapezoidal manner and differ from one another in terms of their cross-sectional area. The cutouts 5a to 5c are formed in an offset manner with respect to one another in the circumferential direction, and furthermore, the cutouts 5a to 5c are also offset with respect to one another in the axial direction. Regions 7 and 8, respectively, of the lateral surface 2 are formed between the cutouts 5a and 5b on the one hand and the cutouts 5b and 5c on the other, said regions 7 and 8, respectively, separating the cutouts from one another in the circumferential direction and in the axial direction.

In the exemplary embodiment according to FIG. 5, too, the cutouts 5a, 5b and 5c correspond to those from the preceding exemplary embodiments. In a similar manner to FIG. 4, the cutouts 5a to 5c are arranged in a manner offset with respect to one another in the circumferential direction, but the cutouts overlap in the axial direction, such that the respectively intermediate region 7 and 8 separates the cutouts from one another only in the circumferential direction, but not in the axial direction.

In the exemplary embodiment according to FIG. 6, the cutouts 5a, 5b and 5c are arranged immediately axially in succession and without an offset in the circumferential direction. The cutouts 5a to 5c are each formed in a rectangular manner, wherein the individual rectangles differ slightly in terms of their cross-sectional area. In each case rectilinear webs 7 and 8 are located between the cutouts 5a to 5c.

In all of the exemplary embodiments, at least the boundary edge 6 remote from the cutting edge 3 having cutting teeth 4 is formed in a rectilinear manner, parallel to the end side 3.

What is claimed is:

1. A cylindrical drill body for a hole saw, comprising:
   cutting teeth located on an end side of the drill body; and
   at least two separately formed cutouts located in a lateral surface of the drill body, wherein each cutout in the at least two separately formed cutouts:
      is located at a different axial distance from the end side; and
      includes at least one respective boundary edge that is at least sectionally rectilinear and at least substantially parallel to the end side,
   wherein a circumferential width of a cross section of each cutout narrows in a direction toward the cutting teeth,
   wherein each cutout is spaced apart in an axial direction from an adjacent cutout by a respective web of the lateral surface,
   wherein each cutout is spaced apart in the axial direction from the end side,
   wherein the at least two separately formed cutouts are located in the lateral surface such that the circumferential width of each cutout is offset in a circumferential direction from a circumferential width of an adjacent cutout of the at least two separately formed cutouts, and
   wherein each cutout is offset only to an extent such that an imaginary axial line intersects the at least two separately formed cutouts.

2. The drill body according to claim 1, wherein the at least one respective boundary edge is located on a side of each cutout remote from the cutting teeth.

3. The drill body according to claim 1, wherein the at least two separately formed cutouts are located in the lateral surface in succession in an axial direction.

4. The drill body of claim 1, wherein an angle between the at least one respective boundary edge and the end side is at most ten degrees.

5. The drill body according to claim 1, wherein each cutout is defined by a lateral edge oriented with a reference line that is angled with respect to an axial direction along a direction of rotation of the drill body.

6. The drill body according to claim 1, wherein each cutout is configured such that a transition between the at least one respective boundary edge and an adjacent lateral edge of the cutout is rounded.

7. The drill body according to claim 1, wherein the cutting teeth are circumferentially spaced apart from one another around the end side of the drill body.

8. The drill body according to claim 1, wherein the at least two cutouts each adjoin a line defined axially along the drill body.

9. The drill body according to claim 8, wherein each cutout is spaced from the line in a circumferential direction by a different distance than other cutouts of the at least two cutouts.

10. A cylindrical drill body for a hole saw, comprising:
    cutting teeth located on an end side of the drill body; and
    at least two separately formed cutouts located in a lateral surface of the drill body, wherein each cutout in the at least two separately formed cutouts:
       is located at a different axial distance from the end side; and
       includes at least one respective boundary edge that is at least sectionally rectilinear and at least substantially parallel to the end side, wherein:
          a circumferential width of a cross section of each cutout narrows in a direction toward the cutting teeth;
          each cutout is spaced apart in an axial direction from an adjacent cutout by a respective web of the lateral surface;
          each cutout is spaced apart in the axial direction from the end side;
          the at least two separately formed cutouts are located in the lateral surface such that the circumferential width of each cutout is offset in a circumferential direction from a circumferential width of an adjacent cutout of the at least two separately formed cutouts;
          the at least two separately formed cutouts are located in the lateral surface such that an axial length of each cutout is offset from an axial length of the adjacent cutout and the axial length of each cutout fails to overlap the axial length of the adjacent cutout;
          the circumferential width of each cutout overlaps the circumferential width of the adjacent cutout; and a respective lateral edge of each cutout is oriented with a respective reference line.

11. A cylindrical drill body for a hole saw, comprising:
cutting teeth located on an end side of the drill body; and
at least two separately formed cutouts located in a lateral surface of the drill body, wherein each cutout in the at least two separately formed cutouts:
 is located at a different axial distance from the end side; and
 includes at least one respective boundary edge that is at least sectionally rectilinear and at least substantially parallel to the end side,
wherein a circumferential width of a cross section of each cutout narrows in a direction toward the cutting teeth,
wherein each cutout is spaced apart in an axial direction from an adjacent cutout by a respective web of the lateral surface,
wherein each cutout is spaced apart in the axial direction from the end side, and
wherein a first cutout of the at least two cutouts has a first ratio of axial length to circumferential width, a second cutout has a second ratio of axial length to circumferential width, and the first and second ratios are different.

12. The drill body according to claim 11, wherein the at least two separately formed cutouts are located in the lateral surface such that the circumferential width of each cutout is offset in a circumferential direction from a circumferential width of an adjacent cutout of the at least two separately formed cutouts.

13. The drill body according to claim 11, wherein the lateral surface includes a region separating each axially adjacent pair of cutouts of the at least two cutouts in a circumferential direction.

14. A cylindrical drill body for a hole saw, comprising:
cutting teeth located on an end side of the drill body; and
at least two separately formed cutouts located in a lateral surface of the drill body, wherein each cutout in the at least two separately formed cutouts:
 is located at a different axial distance from the end side; and
 includes at least one respective boundary edge that is at least sectionally rectilinear and at least substantially parallel to the end side,
wherein a circumferential width of a cross section of each cutout narrows in a direction toward the cutting teeth,
wherein each cutout is spaced apart in an axial direction from an adjacent cutout by a respective web of the lateral surface,
wherein each cutout is spaced apart in the axial direction from the end side, and
wherein a first cutout of the at least two cutouts has a first nominal circumferential width, a second cutout of the at least two cutouts, which is spaced apart from said cutting teeth by a greater distance than the first cutout, has a second nominal circumferential width, and the first nominal circumferential width is greater than the second nominal circumferential width.

15. A cylindrical drill body for a hole saw, comprising:
cutting teeth located on an end side of the drill body; and
at least two separately formed cutouts located in a lateral surface of the drill body, wherein each cutout in the at least two separately formed cutouts:
 is located at a different axial distance from the end side; and
 includes at least one respective boundary edge that is at least sectionally rectilinear and at least substantially parallel to the end side, wherein:
  a circumferential width of a cross section of each cutout narrows in a direction toward the cutting teeth;
  each cutout is spaced apart in an axial direction from an adjacent cutout by a respective web of the lateral surface;
  each cutout is spaced apart in the axial direction from the end side;
  a first cutout of the at least two cutouts, which is closest to said cutting teeth, has a first edge closest to said cutting teeth, and said first edge is rounded; and
  a second cutout of the at least two cutouts, which is further from said cutting teeth than the first cutout, has a second edge closest to said cutting teeth, and said second edge is rectilinear.

* * * * *